Figure 5:
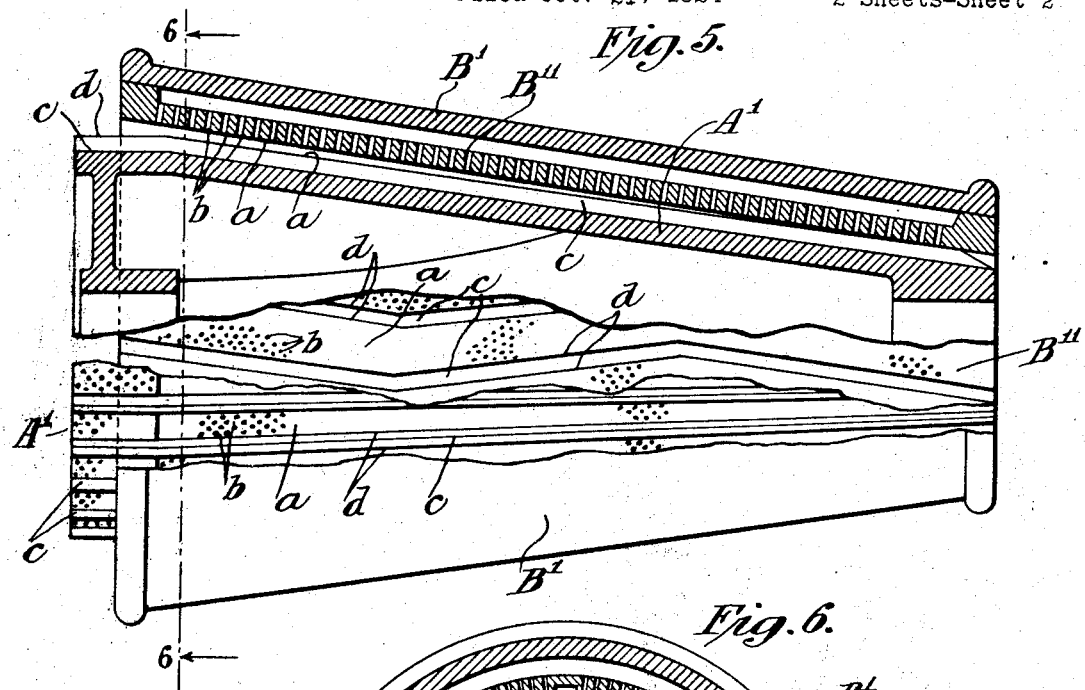

May 11, 1926.
G. L. BIDWELL
MACHINE FOR WORKING PAPER STOCK
Filed Oct. 21, 1924
1,583,771
2 Sheets-Sheet 1
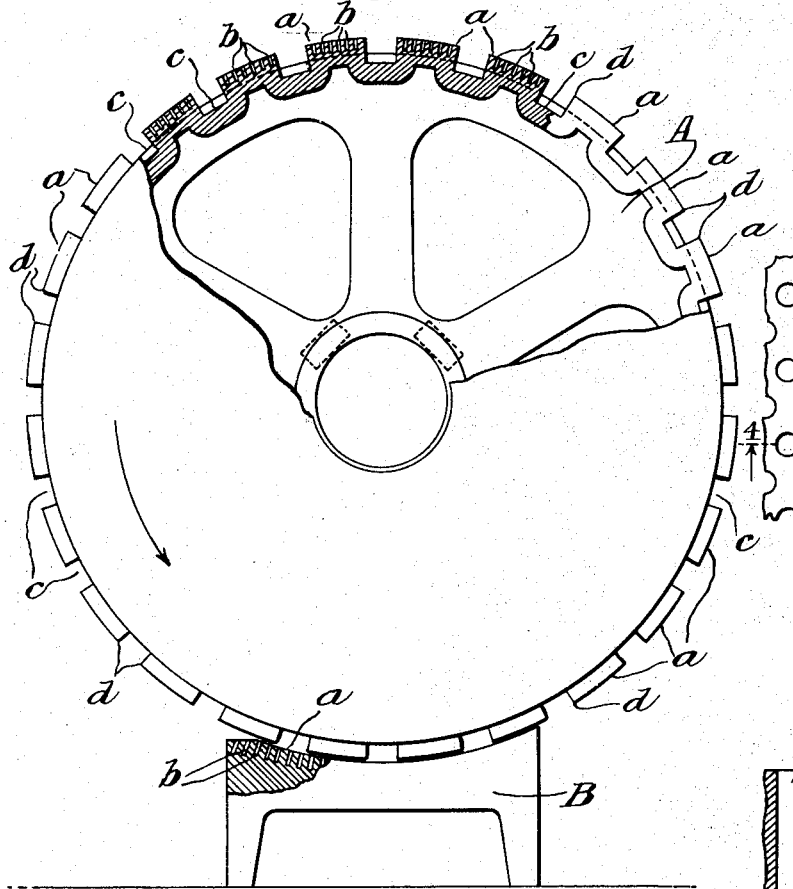
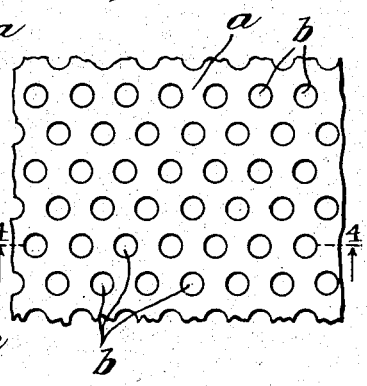
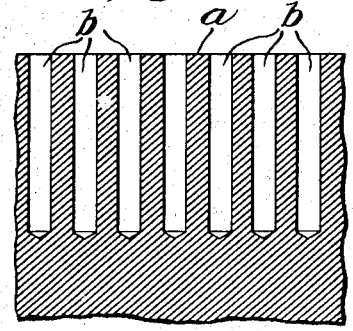
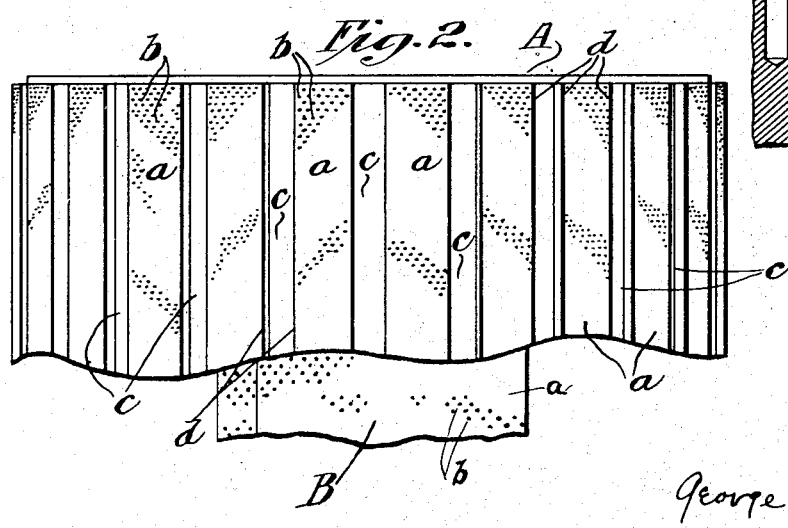
George L. Bidwell
INVENTOR
BY W. B. Whitney
ATTORNEY May 11, 1926.

G. L. BIDWELL 1,583,771

MACHINE FOR WORKING PAPER STOCK

Filed Oct. 21, 1924    2 Sheets-Sheet 2

George L. Bidwell
INVENTOR

BY W. B. Whitney
ATTORNEY

Patented May 11, 1926.

1,583,771

UNITED STATES PATENT OFFICE.

GEORGE L. BIDWELL, OF RIEGELSVILLE, PENNSYLVANIA, ASSIGNOR TO THE WARREN MANUFACTURING COMPANY, OF RIEGELSVILLE, NEW JERSEY, A CORPORATION OF NEW JERSEY.

MACHINE FOR WORKING PAPER STOCK.

Application filed October 21, 1924. Serial No. 744,883.

My present invention relates to machines, such as beater and refining engines, used in the manufacture of paper for the beating and hydration of the stock, and more particularly to the grinding and pulping surfaces of such engines; and the object thereof is to provide in engines of this type a "tackle" for such surfaces which not only will wear well but throughout their useful life will assure a uniform production of pulp fibers of the highest quality.

In beaters and refiners as heretofore constructed the grinding surfaces usually provided therefor consist of knives or bars, of steel or bronze, which when new present very sharp edges, and until these sharp edges are rounded off by wear the engines with which they are equipped produce an inferior grade of paper. As the "tackle" wears in", paper of a better quality is produced and the "stuff" can be prepared in a shorter time without the danger of cutting the fibers. However, as soon as the "tackle" has reached a certain stage of wear, it begins to make rough and lumpy stock, because the knives are too dull and blunt.

As a substitute for this well-nigh universal "tackle" lava stone has been tried—without, however, any great success. The grinding and pulping surface of the lava depends upon the number of cups or cells with which the stone is supposed to be honeycombed. But lava is very irregular in its formation. The cups formed in the stone are neither numerous nor deep enough for efficient action, and, since they are very irregularly distributed, the stone will take on a decided glaze in spots which are not pitted with cups, will wear irregularly, and as it wears will present a surface with the cups ever changing in number and in distribution. The result is that the lava stone is not only very inefficient but is incapable of producing a uniform finished product.

I have discovered that I can eliminate all, or substantially all, of the above-mentioned defects by providing both the stationary and revolving elements of beaters and of Jordan or refining engines with grinding and pulping surfaces, of suitable material preferably metal, which are pitted or honeycombed as it were with artificially formed holes or cells, relatively small in diameter and of substantial depth, clean cut, closely centered, and, preferably, evenly distributed throughout. The elements of the engines in which the pulping surfaces are divided longitudinally at regular intervals by gutters, providing passageways for the circulation of the stock, may either be made as integral castings or may be built up, as is more usual, of alternate longitudinal bars and fillers, the latter forming the gutters. In either case, I prefer that these surfaces be of a drillable metal, such as cast iron, steel, or bronze, and that the holes be drilled therein after the surfaces have been carefully laid out and center punched; and I have found that very satisfactory results are obtained by, and therefore recommend, holes of about five thirty-seconds inch ($\frac{5}{32}''$) diameter and approximately one and one-quarter inches ($1\frac{1}{4}''$) deep drilled on five-sixteenths inch ($\frac{5}{16}''$) centers and staggered in alternate rows. Holes of one-eighth inch ($\frac{1}{8}''$) in depth are effective, but with holes an inch or so deep the surfaces are given a long life. When worn down the holes may be re-drilled or a new element substituted.

The invention is shown, by way of illustration and not of limitation, in the accompanying drawings, in which—

Figure 1 is a view, partly in end elevation and partly in vertical section, of the roll and bed-plate of the beater engine embodying my improvements in what I now consider the best mode for applying the principle thereof to such an engine; Fig. 2 is a plan view of one end of the same roll and bed-plate; Figs. 3 and 4 are details, in plan and section respectively, of a broken portion of my improved grinding and pulping surface, showing to scale the preferred size, depth and distribution of the holes with which it is honeycombed; Fig. 5 is a view of a Jordan engine with heads removed, partly in side elevation and partly in vertical section, showing in the form preferred the application of my improvements to its core and shell-lining; and Fig. 6 is a section on the line 6—6 of Fig. 5.

Referring first to Figs. 1 and 2, the beater roll A and bed-plate B are shown as integral castings, the plate as well as the roll being cast hollow to lighten its weight; and $a\ a$ indicate the pulping surfaces of each and $b\ b$ are the holes drilled therein. In the case of the roll, this surface is divided transversely, at regular intervals, by the longitudinal depressions or gutters c, c, into what may be designated as bars, with sharp edges d d. The pulping surface of the bedplate is its entire concave upper surface, which also may, if desired, be provided with gutters similar to the gutters c c extending longitudinally and somewhat diagonally thereof, and when the holes become shallow by the wearing down of this surface in operation the plate can be re-drilled, which can be done without interruption in service by keeping on hand an extra plate ready drilled.

Figure 6:
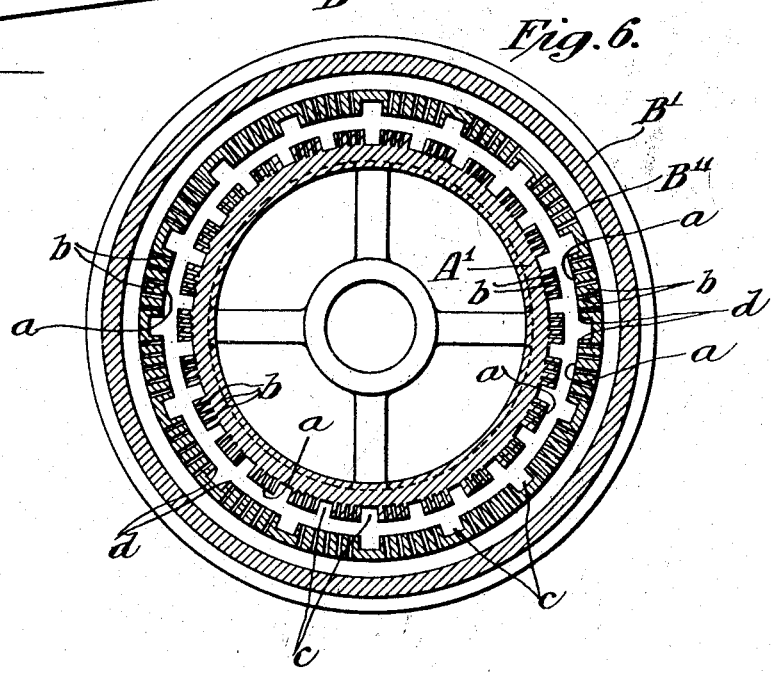

In the Jordan engine, illustrated in Figs. 5 and 6, the core A' rotates within the stationary element, which comprises an outer shell B' and lining B''; and here, as before, a a indicate the pulping surfaces, pitted with holes b b, of the rotary and stationary elements—the outer surface of the core and the inner surface of the shell-lining—both surfaces being in the form of bars separated by and alternating with the longitudinal gutters c c which form the cutting edges d d and serve for the usual circulation of the stock, from the small to the large end of the engine. The holes with which the pulping surfaces of the lining are honeycombed are preferably for convenience, drilled from the outside, through its walls. This casting, provided at its ends with external flanges which serve to center it within the outer shell, is first carefully machined inside and out and then is center punched and drilled; after which it is inserted, tightly wrapped about with paper to cover the holes, in place in the shell and the holes are effectually closed at their outer ends by running cement grouting (not shown) into the annular space formed between the two parts.

The "tackle" thus provided is ideal for the fibration and hydration of pulp for paper stock. The edges of the bars, along the sides of the gutters, produce new fibrages by their cutting action, and these new fibrages partially enter the drilled holes in both the stationary and the revolving elements of the engine and while thus held partly in and partly out of the holes are struck a crushing blow which flattens them out as the revolving element drags them from the holes. This action, which is quite like that of the old stamping machines originally used in the production of pulp for paper, results not only in making very thin and wide fibers of good length but also in quickly bringing them to the desired degree of hydration. Moreover, the product obtained is of uniform excellence owing to the precision with which the holes are laid out and drilled and to the fact that they act the same when new as at all other times throughout their useful life.

What I claim as new, and desire to secure by Letters Patent, is—

1. An element for an engine of the type described the operative face of which is pitted with artificially formed open holes providing, between and around the holes, a smooth solid pulping surface of an area at least equal to the aggregate areas of the holes, substantially as described.

2. An engine of the type described having a solid stock-working surface which is honeycombed with artificially formed holes of relatively small diameter open to a substantial depth and is divided at intervals by gutters extending transversely to the line of its operation.

3. An engine of the type described in which the operative face of at least one of its elements is of homogeneous material providing a smooth pulping surface and is pitted throughout with artificially formed holes of relatively small diameter and substantial depth, clear cut, uniformly distributed, closely centered, and having an aggregate sectional area not exceeding one-half the area of the entire operative face.

4. An engine of the type described in which the operative face, of metal, has drilled therein evenly distributed and closely centered holes of relatively small diameter and substantial depth providing a smooth pulping surface having an area of more than one-half the entire operative face honeycombed by the unfilled holes.

5. An engine of the type described, comprising a stationary and a revolving element the pulping surfaces of which are of metal honeycombed throughout with evenly distributed holes of approximately five thirty-seconds inch diameter and one and one-quarter inch deep drilled therein on about five-sixteenths inch centers.

6. An engine element of the type described the operative pulping surface of which is divided at intervals by depressions extending transversely to the line of operation and providing a series of forward cutting edges and between said depressions is pitted mechanically with small evenly distributed holes open to a substantial depth.

GEORGE L. BIDWELL.